United States Patent
Hirose et al.

(10) Patent No.: US 11,130,319 B2
(45) Date of Patent: *Sep. 28, 2021

(54) MULTILAYER ARTICLE SUITABLE FOR USE AS A FUMIGATION BARRIER

(71) Applicant: KURARAY CO., LTD., Kurashiki (JP)

(72) Inventors: Wataru Hirose, Houston, TX (US); Edgard Chow, Houston, TX (US)

(73) Assignee: Kuraray Co., Ltd., Okayama (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/235,753

(22) Filed: Dec. 28, 2018

(65) Prior Publication Data

US 2019/0203005 A1    Jul. 4, 2019

Related U.S. Application Data (60) Provisional application No. 62/611,997, filed on Dec. 29, 2017.

(51) Int. Cl.
*B32B 27/22* (2006.01)
*C08F 216/06* (2006.01)
*B32B 27/30* (2006.01)
*B32B 27/08* (2006.01)
*B32B 7/12* (2006.01)
*B32B 27/32* (2006.01)
*B32B 27/18* (2006.01)
*C08J 7/04* (2020.01)
*C08J 5/18* (2006.01)

(52) U.S. Cl.
CPC .............. *B32B 27/22* (2013.01); *B32B 7/12* (2013.01); *B32B 27/08* (2013.01); *B32B 27/18* (2013.01); *B32B 27/306* (2013.01); *B32B 27/32* (2013.01); *C08F 216/06* (2013.01); *C08J 5/18* (2013.01); *C08J 7/042* (2013.01); *B32B 2250/05* (2013.01); *B32B 2250/246* (2013.01); *B32B 2250/40* (2013.01); *B32B 2307/73* (2013.01); *C08F 2800/20* (2013.01); *C08J 2329/04* (2013.01)

(58) Field of Classification Search
CPC .... C08F 216/06; B32B 27/306; C08J 2329/04
See application file for complete search history.

(56) References Cited

U.S. PATENT DOCUMENTS

| 2003/0060550 A1* | 3/2003 | Inomata | C08K 3/32 524/394 |
| 2004/0082690 A1* | 4/2004 | Kawahara | C08K 3/38 524/127 |
| 2012/0237747 A1* | 9/2012 | Tai | B32B 27/28 428/216 |
| 2013/0029070 A1* | 1/2013 | Ikeda | C07C 233/38 428/35.7 |

(Continued)

FOREIGN PATENT DOCUMENTS

EP    1477514 A1 * 11/2004    .............. C08K 3/24

*Primary Examiner* — Alicia J Sawdon
(74) *Attorney, Agent, or Firm* — Morgan, Lewis & Bockius LLP (57) ABSTRACT

A multilayer article (such as a film) suitable for use as a fumigation barrier, the multilayer article comprising at least one an ethylene vinyl alcohol (EVOH) based barrier layer formed from a resin composition predominantly comprising an EVOH component of one or more specific types of ethylene-vinyl alcohol copolymers as described herein.

20 Claims, 1 Drawing Sheet

熱流 : thermal flow
温度 : temperature (56) References Cited

U.S. PATENT DOCUMENTS

2013/0032068 A1* 2/2013 Van Wesenbeeck ........................ A01G 9/1438
  111/118
2013/0040087 A1* 2/2013 Kazeto ...................... B32B 1/08
  428/36.5

* cited by examiner

熱流 : thermal flow
温度 : temperature

MULTILAYER ARTICLE SUITABLE FOR USE AS A FUMIGATION BARRIER

CROSS-REFERENCE TO RELATED APPLICATIONS

This application is related to PCT Application PCT/JP2017/023819, filed on 28 Jun. 2017, designating the USA, which is incorporated by reference herein for all purposes as if fully set forth. This application claims priority to U.S. 62/611,997, filed Dec. 29, 2017, which is incorporated by reference herein for all purposes as if fully set forth. This application is also related to U.S. Provisional Application Nos. 62/611,956 (entitled "Multilayer Article Suitable for Use as a Gas Barrier") and 62/611,978 (entitled "Multilayer Article Suitable for Use as a Solvent Barrier"), both filed concurrently on Dec. 29, 2017.

FIELD OF THE INVENTION

The present invention relates generally to a multilayer article (such as a film) suitable for use as a fumigation barrier. More particularly, the present invention relates to such a multilayer article comprising at least one an ethylene vinyl alcohol (EVOH) based barrier layer formed from a resin composition predominantly comprising an EVOH component of one or more specific types of ethylene-vinyl alcohol copolymers as described below.

BACKGROUND OF THE INVENTION

In recent years, the increasing trend for healthier diets has increased demand for more fruits and vegetables, which continues the need to farm in fields that are infested with soil-borne plant pathogens, insects, weeds and/or parasites, such as nematodes. Soil fumigation is often the best or only economical method of reducing those pest populations sufficiently to produce high quality and high yielding crops. In a representative soil fumigation protocol, a fumigant that includes one or more volatile substances such as methyl bromide and chloropicrin is provided in compressed gas cylinders and shank-injected into the soil, for example, about 6 to 18 inches deep using a positive pressure closed system (for example, pressurized with nitrogen gas). In other fumigation methods, the volatile substances are applied to the soil by surface spraying or dripping. The soil is then covered, for example by a plastic sheet, to reduce the loss of fumigants into the atmosphere, which would result in loss of fumigant efficacy. For example, a polyethylene sheet can be laid down over the soil immediately behind the shanks of the injection equipment or immediately behind the sprayer or drip application equipment. The polyethylene sheet, although not impermeable to gases, can reduce the dissipation rate of gases into the air, and thus reduce the depletion of the volatile fumigants by dissipation into the atmosphere. Application of the plastic sheet is also referred to as "mulching" or "tarping" the soil. One example of plastic sheeting that is commonly used for soil mulching is high density polyethylene (HDPE). The end goal is for the volatile substances in the soil to effectively reduce or eliminate the pathogens, insects, weeds, parasites or other pests.

One problem with the soil fumigation approach, however, is that some of the volatile substances in the fumigants escape into the atmosphere. Government regulations have been implemented that require a "buffer zone" of a predetermined size around an area undergoing a fumigation treatment (i.e., application site) when certain fumigants are used, to reduce risks. A buffer zone provides distance between the application site (i.e., edge of a field being treated) allowing airborne residues to disperse with less risk. The size of a given buffer zone is based on the following factors: (1) fumigant application rate; (2) field size; (3) application equipment and methods; (4) fumigant used; and (5) emission-control measures (e.g., tarps). Buffer zone distances are scenario-based using applicable site conditions. Practices that reduce emissions (for example, use of high-barrier tarps) can result in significantly reduced buffer distances and reductions in the amount of fumigant needed to successfully control soil-borne pests.

Fumigant barriers in the form of plastic sheets have been used to contain the fumigant gases. See, for example, U.S. Pat. Nos. 4,812,342, 7,866,088B1, 8,372,417B2, 8,887,651B2, 9,186,873B2, 9,668,475B2, 9,795,126B2, US20070298197A1, US20170332617A1 and JP2014183806A.

Conventionally, plastic sheets include a multi-layered structure of polyethylene and nylon layers, wherein the outermost layers are polyethylene layers and the core layer is a nylon layer. However, the above sheets lead to failure in sufficiently preventing the decrease of performance of fumigant barriers in use at high temperature, and let some gas escape into the environment, often with unwelcome side effects. Thus further improvement is still desired.

Multilayer articles (such as films) containing at least one EVOH-based barrier layer are also in a general sense known for use as fumigant barriers. In general, it has been found that adding an EVOH-based barrier layer to fumigant films sharply improves gas retention, blocking permeation to keep fumigants in the soil. The improvement is so dramatic compared to other films, that such EVOH-containing structures can be considered impermeable.

EVOH is widely accepted in the plastic industry because it can be generally processed in traditional plastic processing methods; however, not all EVOH resins can be extruded uniformly with some specific equipment and/or specific processing conditions, which could affect quality of the resulting product (such as the impermeability of fumigation film).

To improve the quality of EVOH-based films, various methods have been proposed in which an EVOH composition contains acids such as carboxylic acid and phosphoric acid and/or metal salts such as an alkali metal salt and an alkaline earth metal salt each in an appropriate content (see Japanese Unexamined Patent Application, Publication Nos. S64-66262 and 2001-146539). The EVOH compositions obtained by these methods reportedly have improved external appearance characteristics and stability during melt molding, thus being molded into products having superior external appearances. However, further improvement of fumigant barriers in use at high temperature has been still desired. Thus, an object of the present invention is to provide: a multilayer article that is superior in stability during/following melt molding thus it has good thickness distribution; and the multilayer article has good fumigation effect even in use at high temperature; also the multilayer article has excellent toughness.

To improve these properties which the EVOH is desired to have, in particular, fumigant barriers, the inventors found that by carrying out a differential scanning calorimetry at an extremely high cooling rate, discrimination between the crystallization associated with the homogeneous nucleation and the crystallization associated with the heterogeneous nucleation is enabled even in an EVOH composition. The inventors also found that an EVOH composition in which the crystallization associated with the heterogeneous nucleation is not predominant is superior in thickness distribution, also has good fumigation effect and excellent toughness. These findings have led to the completion of the present invention.

SUMMARY OF THE INVENTION

The present invention addresses the above-described problem by providing a multilayer article comprising at least one layer formed from an EVOH resin composition predominantly comprising an EVOH component of one or more ethylene-vinyl alcohol copolymers, wherein:

(1) the EVOH resin composition exhibits a melting point within a range from 155° C. to 200° C., measured at a rate of 10° C./min in accordance with the method described in ISO 11357-3 (2011);

(2) the EVOH resin composition has a heterogeneous nucleation index (f) of less than 0.6 as calculated by formula (I)

$$F = Q_{hetero}/Q_{total} \quad (I)$$

wherein:

$Q_{total}$ represents an area of a total region surrounded by a DSC curve and a base line that is a straight line connecting (i) a point indicating a thermal flow value at a temperature lower than the melting point of the EVOH resin composition by 38° C., and (ii) a point indicating a thermal flow value at a temperature lower than the melting point of the EVOH resin composition by 103° C.;

$Q_{hetero}$ represents an area of a heterogeneous region that is a part of the total region, falling within a range from the temperature lower than the melting point of the EVOH resin composition by 38° C. to a temperature lower than the melting point of the EVOH resin composition by 75° C.;

the DSC curve is obtained by differential scanning wherein the EVOH resin composition is cooled at a rate of 150° C./sec from a molten state at 210° C.; and (3) a monolayer film having thickness of 20 µm prepared from the EVOH resin composition exhibits a mass transfer coefficient (kc) for chloropicrin (cm/hr) that is less than the value calculated by formula (II), measured at 40° C. and 50% relative humidity in accordance with the method described in ASTM E2945-14

$$k_c = 000049x - 0.0125 \quad (II)$$

wherein x=ethylene content of the EVOH component.

The peak of the DSC curve within the range from the temperature lower than the melting point by 38° C. to the temperature lower than the melting point by 75° C. corresponds to the amount of heat released due to the crystallization associated with the heterogeneous nucleation. The peak of the DSC curve within the range from the temperature lower than the melting point by 75° C. to the temperature lower than the melting point by 103° C. corresponds to the amount of heat released due to the crystallization associated with the homogeneous nucleation. Accordingly, the state in which the heterogeneous nucleation index (f), which represents the ratio of the amount of heat $Q_{hetero}$ released due to the crystallization associated with the heterogeneous nucleation to the amount of heat $Q_{total}$ released due to the crystallization as a whole, is less than 0.6 means that the proportion of crystals generated due to the heterogeneous nucleation is low. Thus, the EVOH resin composition is superior in stability and external appearance characteristics during/following melt molding because of uniformity in the size of crystals resulting from the lower proportion of crystals generated due to the heterogeneous nucleation.

The degree of saponification of the ethylene-vinyl alcohol copolymer is typically about 99 mol % or greater. When the EVOH having such a high degree of saponification is used, the heterogeneous nucleation index (f) of the EVOH resin composition is further reduced, thereby enabling the stability and external appearance characteristics during/following melt molding to be further improved.

The ethylene content of the ethylene-vinyl alcohol copolymer is typically about 18 mol % or greater and about 55 mol % or less. When the ethylene content of the EVOH falls within the above range, the heterogeneous nucleation index (f) of the EVOH resin composition is further reduced, thereby enabling the stability and external appearance characteristics during/following melt molding to be further improved.

The content of a higher fatty acid amide with respect to the ethylene-vinyl alcohol copolymer in the EVOH resin composition is typically about 900 ppm or less. When the content of the higher fatty acid amide is about 900 ppm or less, a much lower heterogeneous nucleation index (f) can be obtained, thereby enabling the stability and external appearance characteristics during/following melt molding to be further improved.

It is preferred that the EVOH resin composition contains an alkali metal salt. By virtue of the alkali metal salt contained, the thermal stability, the interlayer strength of a laminate to be formed, etc. can be improved.

The content of the alkali metal salt in terms of alkali metal element equivalent is typically about 10 ppm or greater and about 500 ppm or less. When the content of the alkali metal salt falls within the above range, the heterogeneous nucleation index (f) of the EVOH resin composition can be further reduced, thereby enabling the stability and external appearance characteristics during/following melt molding to be further improved.

According to the aspects of the present invention, a multi layer article is provided that is superior in stability during/following melt molding, has good thickness distribution, has good fumigant barrier effect even in use at high temperature, and also has excellent toughness.

These and other embodiments, features and advantages of the present invention will be more readily understood by those of ordinary skill in the art from a reading of the following detailed description.

DETAILED DESCRIPTION

The present invention relates to a multilayer article (such as a film) containing at least one layer of a specified EVOH-based resin composition, the multilayer article being suitable for use as a fumigation barrier, as well as a fumigation barrier comprising such multilayer article. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false or not present) and B is true (or not present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As used herein, the term "melting point" means a peak top temperature at a melting peak upon heating by a general (common) DSC device at a rate of 10° C./min in accordance with the method described in ISO 11357-3 (2011).

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

EVOH Resin Composition

The EVOH resin composition according to an embodiment of the present invention contains an EVOH as the predominant component. Such EVOH resin compositions are generally disclosed in previously incorporated PCT/JP2017/023819 (filed on 28 Jun. 2017).

The lower limit of the EVOH content of the EVOH resin composition is generally greater than about 50% by mass, or about 80% by mass, or about 90% by mass, or about 95% by mass, or about 99% by mass, or about 99.9% by mass. Such a higher EVOH content leads to an increase in the proportion of the homogeneous nucleation. In general, besides the EVOH, intentionally added components, which will be described below, and minute quantities of unintentionally contaminating impurities are contained in the EVOH resin composition. Although the upper limit of the EVOH content of the EVOH resin composition may substantially be 100% by mass as described above, it is also preferred that an appropriate amount of additives, etc., which will be described below, is contained in the EVOH resin composition. Thus, the resin composition may also be referred to as a resin, a material, a resin material, a material for melt molding, and the like.

The EVOH resin composition has a heterogeneous nucleation index (f) of less than 0.6 as determined by the following formula (I) based on a differential scanning calorimetry (DSC) curve obtained by DSC in which the EVOH resin composition is cooled at a rate of 150° C./sec from a molten state at 210° C.

$$f = Q_{hetero}/Q_{total} \quad (I)$$

Figure 1:
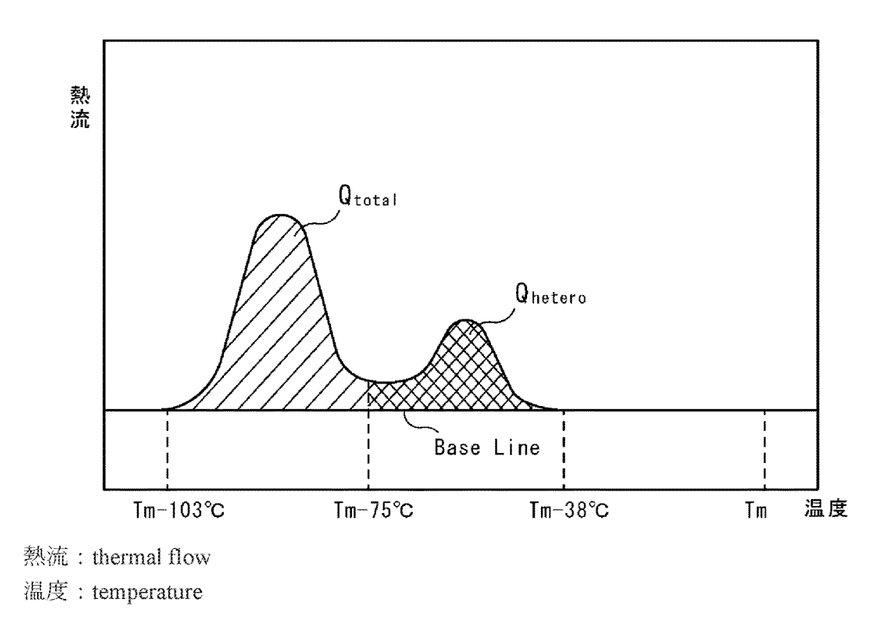
FIG. 1 is a schematic diagram showing a DSC curve obtained by cooling an EVOH resin composition according to an embodiment of the present invention at a rate of 150° C./sec.

A DSC curve is schematically shown in FIG. 1. In the formula (I), $Q_{total}$ represents the area of a total region surrounded by DSC curve and the base line that is a straight line connecting a point indicating a thermal flow value at a temperature lower than the melting point (Tm) by 38° C. and a point indicating a thermal flow value at a temperature lower than the melting point (Tm) by 103° C., and $Q_{hetero}$ represents the area of a heterogeneous region that is a part of the total region, falling within the range from a temperature lower than the melting point (Tm) by 38° C. to a temperature lower than the melting point (Tm) by 75° C. As shown in FIG. 1, a peak for a maximal thermal flow value may appear in each of the region between the temperature lower than the melting point by 38° C. and the temperature lower than the melting point by 75° C., and the region between the temperature lower than the melting point by 75° C. and the temperature lower than the melting point by 103° C. Alternatively, only one peak for a maximal thermal flow value may appear in the region between the temperature lower than the melting point (Tin) by 38° C. and the temperature lower than the melting point by 103° C. It is to be noted that the thermal flow value may also be referred to as, for example, thermal flux value.

The heterogeneous nucleation index (I) is less than 0.6, and the upper limit of the heterogeneous nucleation index (f) is about 0.55, or about 0.51. Thus, when the amount of heat released due to the crystallization associated with the heterogeneous nucleation is small, i.e., when the proportion of the crystals formed by the heterogeneous nucleation is low, the EVOH resin composition contains crystals of uniform size, thereby leading to superior stability and external appearance characteristics during/following melt molding. Furthermore, molded articles formed from the EVOH resin composition can have sufficient impact resistance. On the other hand, the lower limit of the heterogeneous nucleation index (f) is not particularly limited, and may be 0, or may be about 0.01, or may be about 0.1. In light of the impact resistance of the molded article to be obtained, the lower limit of the heterogeneous nucleation index (f) is about 0.1, or about 0.2, about 0.3.

The differential scanning calorimetry at a cooling rate of 150° C./sec may be carried out by using a "Flash DSC 1" (Mettler-Toledo LLC, Columbus, Ohio USA). The "Flash DSC 1" employs a system that allows a sample to be in direct contact on a sensor, and the measurement can be conducted with a sample in an amount of less than 100 ng. Thus, excellent thermal conduction between the sample and the sensor is achieved, which enables an ultrafast temperature drop. The sample piece (resin composition) to be subjected to the measurement is shaped to a plate having a length of 80 μm, a width of 80 μm and a thickness of 10 μm.

Exemplary procedures for adjusting the heterogeneous nucleation index (f) to be less than 0.6 may include:

(1) increasing the degree of saponification of the EVOH;
(2) providing an EVOH having a comparatively high ethylene content;
(3) reducing impurities by way of, for example, sufficient washing;
(4) adjusting the content of the alkali metal salt, etc., to fall within an appropriate range;
(5) adjusting the carboxylic acid content and the carboxylate ion content to fall within appropriate ranges;
(6) adjusting the content of the lubricant to fall within an appropriate range;
(7) adjusting a bath temperature for pelletization to be low;
(8) drying the pellets in a comparatively shorter period of time at a high temperature; and
(9) drying the pellets in an inert gas atmosphere; and the like.

These procedures may be combined as appropriate.

An additive and/or an impurity contained in the EVOH resin composition may serve as a nucleating agent, whereby the heterogeneous nucleation is likely to be accelerated. Thus, when the content of such a component capable of serving as a nucleating agent is comparatively decreased, a lower heterogeneous nucleation index (f) can be obtained (e.g., (3) to (6)). However, in the case where a slight amount of lubricant (e.g., about 50 ppm or greater and about 500 ppm or less) is contained, the heterogeneous nucleation index can be lower than the heterogeneous nucleation index obtained in the case where no lubricant is contained, although the reason for this effect is not clear. Furthermore, in the process of producing an EVOH resin composition, a low molecular weight component may be generated due to, for example, heating of EVOH, and serves as a nucleating agent to accelerate the heterogeneous nucleation. Thus, when the production is carried out in an environment which is unlikely to involve heat deterioration comparatively, a lower heterogeneous nucleation index (f) can be obtained (e.g., (7) to (9)).

The following will describe the constitution and the like of the EVOH resin composition of the embodiment of the invention.

Ethylene-Vinyl Alcohol Polymers

The EVOH contained in the EVOH resin composition is a polymer including an ethylene unit (—$CH_2$—$CH_2$—) and a vinyl alcohol unit (—$CH_2$—CHOH—) as main structural units. The EVOH may include other structural unit(s) within a range not leading to impairment of the effects of the present invention.

The lower limit of the ethylene content of the EVOH (i.e., the ratio of the number of ethylene units with respect to the total number of monomer units in the EVOH) is typically about 18 mol %, or about 24 mol %, about 27 mol %. On the other hand, the upper limit of the ethylene content of the EVOH is typically about 55 mol %, or about 48 mol %.

When the ethylene content of the EVOH is greater than or equal to the lower limit, gas barrier property, melt formability, inhibitory ability of generation of yellowing, etc. of the article to be obtained under high humidity can be improved. To the contrary, when the ethylene content of the EVOH is less than or equal to the upper limit, the gas barrier property of the article to be obtained can be further improved.

The lower limit of the degree of saponification of the EVOH (i.e., the ratio of the number of vinyl alcohol units with respect to the total number of vinyl alcohol units and vinyl ester units in the EVOH) may be, for example, about 90 mol %, or about 99 mol %, or about 99.5 mol %. On the other hand, the upper limit of the degree of saponification of the EVOH is substantially 100 mol %, or about 99.99 mol %. When the degree of saponification of the EVOH is greater than or equal to the lower limit, a much lower heterogeneous nucleation index (f) can be obtained, thereby enabling the stability and the external appearance characteristics during/following melt molding to be improved.

Additives

The EVOH resin composition may contain additives such as a variety of acids and metal salts for enhancing each performance. Exemplary additives include an alkali metal salt, a carboxylic acid and/or a carboxylate ion, as well as a phosphoric acid compound, a boron compound, a lubricant, and the like. In some cases, it is preferred that the resin composition is free of these additives.

In light of the thermal stability, the interlayer strength of a laminate to be formed, etc., it is preferred that the EVOH resin composition contains an alkali metal ion. The lower limit of the alkali metal ion content of the EVOH resin composition in terms of alkali metal element equivalent is generally about 10 ppm, or about 50 ppm. On the other hand, the upper limit thereof is generally about 500 ppm, or about 400 ppm, or about 300 ppm.

When the alkali metal ion content is greater than or equal to the lower limit, the addition of the alkali metal ion produces satisfactory effects. On the other hand, when the alkali metal ion content is less than or equal to the upper limit, the heterogeneous nucleation index (f) of the EVOH resin composition is sufficiently reduced, thereby enabling the stability in melt molding and the external appearance characteristics to be improved.

The procedure of adjusting the content of the alkali metal element to fall within the above range is not particularly limited. Exemplary procedures of blending the alkali metal element into the EVOH include: immersing the EVOH in a solution containing the alkali metal element; blending a compound containing the alkali metal element or a solution containing the alkali metal element with the EVOH in a molten state; blending a compound containing the alkali metal element with the EVOH dissolved in an appropriate solvent; and the like.

In the case of immersing the EVOH in a solution containing the alkali metal element, the concentration of the alkali metal element in the solution is not particularly limited. In light of ease in handling etc., the solvent in the solution is preferably an aqueous solution, which is not particularly limited thereto. In general, the mass of the solution into which the EVOH is to be immersed is typically at least about 3 times greater, or at least about 10 times greater, than the mass of the EVOH in a dry state. A suitable range of the time period over which the EVOH is immersed varies by mode thereof, the immersion time period is typically at least about 1 hour, or at least about 2 hours. The immersion treatment in the solution is not particularly limited, and may be carried out in separate solutions or may be carried out at once. In light of a simplification of the process, the immersion treatment is preferably carried out at once. Also, the immersion treatment is suitably carried out in a continuous manner by using a column type device.

The resin composition may contain a carboxylic acid and/or a carboxylate ion. The carboxylic acid and the carboxylate ion produce the effect of improving the thermal stability through regulating the pH of the resin composition and preventing gelation. In the case where the resin composition contains the carboxylic acid and/or the carboxylate ion, the lower limit of the content of the carboxylic acid and the carboxylate ion is typically about 1 ppm, or about 10 ppm. On the other hand, the upper limit thereof is typically about 400 ppm, or about 300 ppm, or about 200 ppm, or about 100 ppm, or about 50 ppm, or about 25 ppm. When the content of the carboxylic acid and the carboxylate ion is greater than or equal to the lower limit, the addition of the carboxylic acid and the carboxylate ion produces satisfactory effects. On the other hand, when the content is less than or equal to the upper limit, a lower heterogeneous nucleation index (f) can be obtained, thereby enabling the stability in melt molding and the external appearance characteristics to be further improved.

Examples of the carboxylic acid include succinic acid, adipic acid, benzoic acid, capric acid, lauric acid, stearic acid, glycolic acid, lauric acid, citric acid, tartaric acid, formic acid, acetic acid, propionic acid, and the like. Of these, acetic acid, propionic acid and lactic acid are preferred, acetic acid and propionic acid are more preferred, and acetic acid is still more preferred, in light of proper acidity and ease in regulating the pH of the resin composition.

The resin composition typically has a pH of about 4 or greater and about 7 or less. When the pH falls outside the above range, i.e., when the resin composition is too strongly acidic or is alkaline, the EVOH may be prone to deterioration, etc., which may lead to a higher heterogeneous nucleation index (f), and accordingly to impairment of the stability in melt molding and the external appearance characteristics.

The EVOH resin composition may contain a phosphoric acid compound. The phosphoric acid compound produces the effect of improving the thermal stability and the like. The content of the phosphoric acid compound in terms of phosphoric acid radical equivalent in the resin composition may be about 1 ppm or greater and about 500 ppm or less. The upper limit of the content of the phosphoric acid compound in terms of phosphoric acid radical equivalent is typically about 200 ppm, or about 100 ppm, or about 50 ppm, or about 20 ppm. The type of the phosphoric acid compound is not particularly limited, and a variety of acids such as phosphoric acid and phosphorus acid, and salts thereof may be applicable. The phosphate may be in the form of a monophosphate salt, a diphosphate salt or a triphosphate salt, and the cationic species contained in the phosphate are not particularly limited, but alkali metal salts and alkaline earth metal salts are preferred. In particular, it is preferred that the phosphoric acid compound is contained in the form of phosphate acid, sodium dihydrogen phosphate, potassium dihydrogen phosphate, disodium hydrogen phosphate or dipotassium hydrogen phosphate, and it is more preferred that the phosphoric acid compound are added in the form of phosphoric acid, sodium dihydrogen phosphate or potassium dihydrogen phosphate.

The EVOH resin composition may contain a boron compound. The boron compound is exemplified by: boric acids such as orthoboric acid, metaboric acid and tetraboric acid; boric acid esters; boric acid salts; boron hydride compounds;

and the like. Examples of the boric acid salt include alkali metal salts and alkaline earth metal salts of the aforementioned boric acids, borax, and the like. In the case where the boron compound is added, the content thereof in terms of boron element equivalent may be, for example, about 20 ppm or greater and about 2,000 ppm or less.

The procedure of adding the aforementioned carboxylic acid, carboxylate ion, phosphoric acid compound and boron compound is not particularly limited. For example, a procedure similar to the aforementioned procedure of blending the alkali metal element may be employed.

The lubricant enables the stability, long-run workability, external appearance characteristics, etc. during/following melt molding to be improved. Furthermore, in the case where a slight amount of the lubricant is added as mentioned above, a lower heterogeneous nucleation index (f) can be obtained.

The lubricant is not particularly limited, and may be exemplified by higher fatty acid amides, higher fatty acid metal salts (e.g., calcium stearate, etc.), low molecular weight polyolefins (e.g., low molecular weight polypropylene, low molecular weight polyethylene having a molecular weight of about 500 to about 10,000, etc.), and the like, which are not limited thereto. Of these, higher fatty acid amides are suitably used, and specific examples thereof include higher saturated fatty acid amides (e.g., stearic acid amide, palmitic acid amide, lauric acid amide, etc.), higher unsaturated higher fatty acid amides (e.g., oleic acid amide, erucic acid, etc.), higher bis-fatty acid amides (e.g., ethylenebis-stearic acid amide, methylenebis-stearic acid amide, etc.), and the like. It is to be noted that the higher fatty acid as referred to herein means a fatty acid having at least 6 carbon atoms, and preferably the fatty acid should have at least 10 carbon atoms. Of these, higher bis-fatty acid amides are preferred, and ethylenebis-stearic acid amides are more preferred.

The upper limit of the content of the lubricant, especially the higher fatty acid amide, with respect to the mass of the EVOH is typically about 900 ppm, or about 500 ppm, or about 300 ppm. On the other hand, the lower limit of the content is typically about 50 ppm, or about 100 ppm. When the content of the lubricant falls within the above range, a lower heterogeneous nucleation index (f) can be obtained, thereby enabling the stability, long-run workability and external appearance characteristics, etc. during/following melt molding to be achieved.

The EVOH resin composition may contain, in addition to the additives, an appropriate amount of, for example, a plasticizer, a stabilizer, an antioxidant, a surfactant, a coloring material, a fluorescent whitening agent, an ultraviolet ray absorbing agent, an antistatic agent, a drying agent, a crosslinking agent, a metal salt other than alkali metal salts, a filler, and a reinforcing agent such as various types of fibers, within a range not leading to impairment of the effects of the present invention.

Moreover, an appropriate amount of a thermoplastic resin other than the EVOH may be blended into the EVOH resin composition, within a range not leading to impairment of the effects of the present invention. The thermoplastic resin to be used is exemplified by various types of polyolefins (e.g., polyethylene, polypropylene, poly-1-butene, poly(4-methyl-1-pentene), ethylene-propylene copolymers, copolymers of ethylene with an α-olefin having at least 4 carbon atoms, copolymers of polyolefin with maleic anhydride, ethylene-vinyl ester copolymers, ethylene-acrylic acid ester copolymers, modified polyolefins obtained by graft-modifying them with an unsaturated carboxylic acid or a derivative thereof, etc.), various types of nylons (e.g., nylon-6, nylon-6,6, nylon-6/6,6 copolymers, etc.), polyvinyl chlorides, polyvinylidene chlorides, polystyrenes, polyacrylonitriles, polyurethanes, polyacetals, modified polyvinyl alcohol resins, and the like.

In some cases, the upper limit of the content of components other than the EVOH, the alkali metal salt, the carboxylic acid, the carboxylate ion, the phosphoric acid compound, the boron compound and the lubricant in the resin composition is typically about 10,000 ppm, or about 1,000 ppm, or about 100 ppm. When the content of the other components is less than or equal to the upper limit, the acceleration of the heterogeneous nucleation caused by the other components serving as a nucleating agent is inhibited, and a much lower heterogeneous nucleation index (f) can be obtained.

The state of the EVOH resin composition is not particularly limited, and the resin composition may be in the form of a solution, a paste, a powder, a pellet, a film, or the like.

Production Method of EVOH Resin Composition

The EVOH resin composition may be produced by, for example, the following steps, each of which may be omitted as appropriate:
(1) a step of copolymerizing ethylene and a vinyl ester to obtain an ethylene-vinyl ester copolymer (EVAc) (polymerization step);
(2) a step of saponifying the EVAc to obtain an EVOH (saponification step);
(3) a step of obtaining pellets that contain the EVOH, from a solution or a paste containing the EVOH (pelletization step);
(4) a step of washing the pellets (washing step); and
(5) a step of drying the pellets (drying step).

(1) Polymerization Step

A copolymerization procedure of ethylene with a vinyl ester is not particularly and for example, solution polymerization, suspension polymerization, emulsion polymerization, bulk polymerization, or the like may be employed. In addition, the copolymerization procedure may be either continuous or batch-wise.

Examples of the vinyl ester for use in the polymerization include fatty acid vinyl esters such as vinyl acetate, vinyl propionate and vinyl pivalate, and the like. Of these, vinyl acetate is preferred.

As the copolymer component in the polymerization, a small amount of a copolymerizable monomer other than the aforementioned components may also be copolymerized, and examples of such a copolymerizable monomer include: alkenes other than ethylene; unsaturated acids such as acrylic acid, methacrylic acid, crotonic acid, maleic acid and itaconic acid, anhydrides thereof, salts thereof, or mono- or di-alkyl ester thereof, etc.; nitriles such as acrylonitrile and methacrylonitrile; amides such as acrylamide and methacrylamide; olefin sulfonic acids such as vinylsulfonic acid, allylsulfonic acid and methallylsulfonic acid or salts thereof; alkyl vinyl ethers; vinyl ketone; N-vinylpyrrolidone, vinyl chloride; vinylidene chloride; 2-methylene-1,3-propanediol diacetate; and the like.

A vinylsilane compound may also be contained as the copolymer component. Examples of the vinylsilane compound include vinyltrimethoxysilane, vinyltriethoxysilane, vinyltri(β-methoxyethoxy)silane, γ-methacryloyloxypropylmethoxysilane, and the like. Of these, vinyltrimethoxysilane and vinyltriethoxysilane are suitably used.

The solvent for use in the polymerization is not particularly limited as long as it is an organic solvent in which the ethylene, the vinyl ester and the ethylene-vinyl ester copolymer are dissolvable. Example of the solvent to be used include alcohols such as methanol, ethanol, propanol, n-butanol and tert-butanol; dimethyl sulfoxide; and the like. Of these, methanol is particularly preferred in light of favorable removability and separability after the reaction.

Examples of the catalyst for use in the polymerization include: azonitrile initiators such as 2,2-azobisisobutyronitrile, 2,2-azobis-(2,4-dimethylvaleronitrile), ethoxy-2,4-dimethylvaleronitrile) and 2,2-azobis-(2-cyclopropylpropionitrile); organic peroxide initiators such as isobutyl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide; and the like.

The polymerization temperature may be, for example, about 20° C. or greater and about 90° C. or less. The polymerization time period may be, for example, at least about 2 hours and at most about 15 hours. The rate of polymerization with respect to the amount of the vinyl ester charged may be about 10% or greater and about 90% or less.

In general, after the polymerization is carried out for a specified time period or a specified rate of polymerization is attained, a polymerization inhibitor is added as needed, and unreacted ethylene gas is removed by evaporation. Thereafter, unreacted vinyl ester is removed. As the procedure of removing the unreacted vinyl ester, a procedure may be adopted which involves: continuously supplying a solution of the copolymer at a constant rate from the top of a raschig ring-packed tower; blowing vapor of the organic solvent such as methanol into the tower from the bottom thereof, thereby allowing a vapor mixture of the organic solvent such as methanol and unreacted vinyl ester to be distilled off from the top of the tower; and taking out, from the bottom of the tower, the solution of the copolymer from which the unreacted vinyl ester has been removed.

(2) Saponification Step

Then, the EVAc obtained in the aforementioned step is saponified. The saponification procedure may be either continuous or batch-wise. Although the catalyst for use in the saponification is not particularly limited, alkali catalysts are preferred, examples of which include sodium hydroxide, potassium hydroxide, alkali metal alcoholate, and the like.

In the case of, for example, batch-wise saponification, the conditions may involve: the concentration of the copolymer in the solution being about 10% by mass or greater and about 50% by mass or less; the reaction temperature being about 30° C. or greater and about 60° C. or less; the amount of the catalyst used with respect to 1 mol of the vinyl ester structural unit being about 0.02 mol or greater and about 0.6 mol or less; and the saponification time period being at least about 1 hour and at most about 6 hours.

A solution or a paste containing the EVOH is thus obtained. Since the EVOH having undergone the saponification reaction contains the alkali catalyst, by-product salts such as sodium acetate and potassium acetate, and other impurities, these are preferably removed by neutralization and washing as needed. Accordingly, a much lower heterogeneous nucleation index (f) can be obtained. In a case where the EVOH having undergone the saponification reaction is washed with water such as ion-exchange water containing almost no metal ions, chloride ions, etc., sodium acetate and potassium acetate may be partially allowed to remain, (3) Pelletization Step Then, the EVOH solution or the EVOH paste thus obtained is pelletized. The procedure of pelletization is not particularly limited, and is exemplified by: a procedure in which a mixed solution of alcohol and water containing the EVOH is cooled to permit coagulation, followed by cutting; a procedure in which the EVOH is melt-kneaded in an extruder and discharged therefrom, followed by cutting; and the like. Specific examples of the procedure of cutting the EVOH include: a procedure in which the EVOH is extruded into a strand form and cut with a pelletizing machine; a procedure in which the EVOH discharged from a die is cut by way of center hot cutting or underwater cutting; and the like.

In the case where the EVOH solution is extruded into a strand form for pelletization, a coagulating liquid for use in deposition is exemplified by: water; a mixed solvent of water and alcohol; aromatic hydrocarbons such as benzene; ketones such as acetone and methyl ethyl ketone; ethers such as dipropyl ether; organic esters such as methyl acetate, ethyl acetate and methyl propionate; and the like. In light of ease of handling, water or a mixed solvent of water and alcohol is preferred. Examples of the alcohol include methanol, ethanol, propanol, and the like. For industrial use, methanol is preferred. In the coagulating liquid, the mass ratio of the coagulating liquid to the EVOH strand (coagulating liquid/EVOH strand) is not particularly limited, but is typically about 50 or greater and about 10,000 or less. When mass ratio falls within the above range, EVOH pellets of uniform size can be obtained.

The lower limit of the temperature at which the EVOH solution is brought into contact with the coagulating liquid (a bath temperature for pelletization) is typically about −10° C., or about 0° C. On the other hand, the upper limit thereof is typically about 40° C., or about 20° C., or about 15° C., or about 10° C. When the temperature is greater than or equal to the lower limit, the deposition of a low molecular weight component is inhibited, whereby a much lower heterogeneous nucleation index (f) can be obtained. To the contrary, when the temperature is less than or equal to the upper limit, elevation of the heterogeneous nucleation index (f) caused by the heat deterioration of the EVOH can be inhibited.

The EVOH solution is extruded from a nozzle having a desired shape into a strand form in the coagulating liquid. The shape of the nozzle is not particularly limited, but is preferably cylindrical. The EVOH (solution) is thus extruded into a strand form from the nozzle. In this procedure, it is not always required that the number of the strand is one, and may be any number from several to several hundred for the extrusion.

Then, the EVOH extruded in a strand form is permitted to coagulate sufficiently before being cut and pelletized, and thereafter, the EVOH pellets are washed with water. In a case where each pellet has a circular cylindrical shape, the diameter thereof may be about 1 mm or greater and about 10 mm or less, and the length thereof may be about 1 mm or greater and about 10 mm or less. In a case where each pellet has a spherical shape, the diameter thereof may be about 1 mm or greater and about 10 mm or less.

(4) Washing Step

Subsequently, the EVOH pellets are washed with water in a water bath. Oligomers and impurities in the EVOH pellets are removed in the water washing treatment. The lower limit of the water temperature for water-washing is typically about 10° C. On the other hand, the upper limit of the water temperature is typically about 80° C. An aqueous acetic acid solution or ion-exchange water can be used in water washing. It is preferred that water washing is eventually performed with ion-exchange water. Water washing with ion-exchange water is typically performed at least twice, for at least about 1 hour at a time. The water temperature of ion-exchange water in this treatment is typically about 5° C. or greater and about 60° C. or less, and the liquor ratio is typically about 2 or greater. Thus, oligomers and impurities are sufficiently removed, and a much lower heterogeneous nucleation index (f) can be obtained.

After the washing step, the pellets may be optionally immersed in a solution containing an alkali metal, etc., as described above, so as to contain the same.

(5) Drying Step

Subsequently, the pellets are dried to obtain dry pellets of the resin composition. The lower limit of the drying time period is, for example, about 3 hours, or about 5 hours. On the other hand, the upper limit of the drying time period is, for example, about 100 hours, or about 50 hours, or about 30 hours. It is to be noted that the drying time period for pellets herein means a time period required to reduce the moisture content of pellets to less than about 0.5% by mass.

The lower limit of the drying temperature (atmosphere temperature) during the drying is typically about 100° C., or about 110° C., or about 120° C., or about 125° C. On the other hand, the upper limit thereof is typically about 150° C., or about 140° C. When the drying temperature is greater than or equal to the lower limit, efficient and sufficient drying can be carried out, leading to reductions in the drying time period. On the other hand, when the drying temperature is less than or equal to the upper limit, heat deterioration of the EVOH can be inhibited.

The drying may be carried out in an air atmosphere, but is typically carried out in an inert gas atmosphere. Thus, deterioration of the EVOH can be inhibited, and a lower heterogeneous nucleation index (f) can be obtained. The drying may be carried out under a reduced pressure or while permitting dehumidification. The drying procedure in the drying step is not particularly limited, and drying under ultraviolet irradiation or infrared irradiation as well as hot-air drying may be carried out.

Multilayer Articles (Extrusion-Molded Article, Injection-Molded Article, Blow-Molded Article)

In general, the molded article may be obtained by melt molding of the EVOH resin composition. The EVOH resin composition comprised in the molded article also has a heterogeneous nucleation index (f) of less than 0.6. The EVOH resin composition is typically used for the core layer of the multilayer articles of the present invention.

The melt molding procedure for obtaining the molded product is exemplified by cast extrusion, blown extrusion, injection molding, blow molding, and the like. The melting temperature during melt molding is not particularly limited, but is typically about 150° C. or greater and about 300° C. or less. The films, the sheets, etc. may be monoaxially or biaxially stretched.

The multilayer articles of the present invention have at least one layer of the EVOH resin composition.

A resin contained in another constituent layer of the multilayer article of the present invention, which is not the layer of the EVOH resin composition, is not particularly limited. In order to avoid moisture, which causes worse barrier property of the EVOH resin composition, the resin contained in another constituent layer is typically a hydrophobic thermoplastic resin composition comprising, as a predominant portion, one or more hydrophobic thermoplastic resins. Examples of suitable hydrophobic thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-C20 α-olefin) copolymers; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins such as chlorinated polyethylenes and chlorinated polypropylenes; and aromatic and aliphatic polyketones. In terms of mechanical strength and molding processability, polyolefin resins are preferable, and polyethylenes and polypropylenes are particularly preferable among these.

For the hydrophobic thermoplastic resin composition, an anti-ultraviolet agent and is preferably added. Examples of the anti-ultraviolet agent include an ultraviolet absorber, a light stabilizer, and a colorant.

The content of the anti-ultraviolet agent in the hydrophobic thermoplastic resin is typically from about 1% by weight, or about 2% by weight, or about 3% by weight, to about 10% by weight, or to about 8% by weight, or to about 5% by weight, based on the total weight of the hydrophobic thermoplastic resin composition. When the content is less than these ranges, the hydrophobic thermoplastic resin composition tends to be degraded by ultraviolet light. When the content is greater than these ranges, the hydrophobic thermoplastic resin composition has poor mechanical strength.

Regarding the melt viscosity of the hydrophobic thermoplastic resin composition, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the hydrophobic thermoplastic resin composition and the MFR of the EVOH resin composition is preferably small. When the melt viscosity of the hydrophobic thermoplastic resin composition is as described above, an excellent multilayer article without layer turbulence can be obtained.

For adhesion between the layer of the EVOH resin composition (EVOH resin composition layer) and the layer of the hydrophobic thermoplastic resin composition (hydrophobic thermoplastic resin layer), an adhesive resin layer is typically interposed between these layers. An adhesive resin therein is not particularly limited and can be selected from various resins. Typical examples of the adhesive resin include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/1.0 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

An example of the layer structure of the multilayer article (such as a film) is shown below, in which the EVOH resin composition layer is represented as F, the (each) hydrophobic thermoplastic resin layer as A, and the (each) adhesive resin layer as AD. A layer closer to the left end of the layer structure corresponds to a layer arranged closer to the outside (a side that is exposed to the external environment).

Five layers: A/AD/F/AD/A, A/AD/F/AD/F, AD/F/AD/F/AD

Six layers: A/AD/F/AD/A/A, A/A/AD/F/AD/A, AD/F/AD/F/AD/A, A/AD/F/AD/F/AD

Seven layers: A/AD/F/AD/F/AD/A, A/A/AD/F/AD/A/A

For preventing moisture in order to avoid degrading oxygen barrier property, a structure, in which the EVOH resin composition layer represented as F is used as an intermediate layer and the hydrophobic resin composition layer is used as an outer layer, is preferable. And the structures of A/AD/F/AD/AA and A/A/AD/F/AD/A/A are more preferable among these.

Regarding the thickness of a multilayer film in accordance with one embodiment of the present invention, the total thickness thereof is typically from about 5 μm, or from about 10 μm, or from about 15 μm, or from about from 20 μm, to about 200 μm, or to about 150 μm, or to about 100 μm, or to about 75 μm. The thickness of the (each) hydrophobic resin composition layer in the film is not particularly limited, but is typically from about 0.5 μm, or from about 1 μm, or from about 2 μm, to about 100 μm, or to about from 20 μm, or to about 10 μm. The thickness ratio of the EVOH resin composition layer in the total layer thickness is not particularly limited, but desirably ranges from about 1%, or from about 2%, or from about 3%, to about 30%, or to about 28%, or to about 25%, of the total layer thickness.

Methods of producing multilayer articles in accordance with the present invention are broadly classified into a process involving melting the EVOH resin composition and then molding the resultant melt (a melt molding process), and also a process involving dissolving the EVOH resin composition in solvent and then molding the resultant solution (such as a solution coating process), for example. From the viewpoint of productivity, the melt molding process is preferable among these. Specific examples thereof include the following: melt extrusion of the hydrophobic thermoplastic resin on a molded article of the EVOH resin composition; melt extrusion to form the EVOH resin composition layer on a base material such as the hydrophobic thermoplastic resin; and co-extrusion of the EVOH resin composition and the hydrophobic thermoplastic resin. Typically, cast co-extrusion or blown co-extrusion is used.

EXAMPLES

Hereinafter, the embodiments of the present invention will be described in more detail by way of Examples, but the present invention is not in any way limited to these Examples.

Synthesis Example 1

(1) Synthesis of Ethylene-Vinyl Acetate Copolymer

Into a 250 L-pressurization reactor equipped with a jacket, a stirrer, a nitrogen-feeding port, an ethylene-feeding port and an initiator-adding port, 105 kg of vinyl acetate (hereinafter, also referred to as VAc) and 38.3 kg of methanol (hereinafter, also referred to as MeOH) were charged, and then were heated to 60° C. Thereafter, nitrogen replacement in the reactor was carried out for 30 min by bubbling nitrogen. Then, ethylene was introduced into the reactor so as to give the pressure (ethylene pressure) of 3.7 MPa. After regulating the temperature in the reactor to 60° C., 24.4 g of 2,2-azobis(2,4-dimethylvaleronitrile) ("V-65" available from Wako Pure Chemical Industries, Ltd.) as an initiator was added in a methanol solution to start polymerization. During the polymerization, the ethylene pressure was maintained at 3.7 MPa and the polymerization temperature vas maintained at 60° C. Four hours later, when the rate of polymerization of VAc reached 44%, the polymerization was stopped by cooling. The reactor was opened to remove ethylene, and then a nitrogen gas was bubbled to completely remove ethylene. Then, after unreacted VAc was removed under a reduced pressure, MeOH was added to an ethylene-vinyl acetate copolymer (hereinafter, also referred to as EVAc) to obtain a 20% by mass solution in MeOH.

(2) Saponification of EVAc

Into a 500-L reactor equipped with a jacket, a stirrer, a nitrogen-feeding port, a reflux condenser and a solution-adding port, 250 kg of the 20% by mass EVAc solution in MeOH obtained in (1) was charged. While nitrogen gas was blown into the solution, the temperature of the solution was elevated to 60° C., and 4 kg of sodium hydroxide as a 2 N solution in MeOH was added. After the addition of sodium hydroxide, the mixture was stirred for 2 hours to allow the saponification reaction to proceed while the temperature in the system was maintained at 60° C. After a lapse of 2 hours, 4 kg of sodium hydroxide was added again in a similar manner, and the mixture was continuously stirred under heating for 2 hours. Thereafter, 14 kg of acetic acid was added to stop the saponification reaction, and then 50 kg of ion-exchange water was added to the mixture. MeOH and water were distilled off from the reactor while the mixture was stirred under heating, whereby the reaction liquid was concentrated. After a lapse of 3 hours, 50 kg of ion-exchange water was further added to permit deposition of an ethylene-vinyl alcohol copolymer (hereinafter, also referred to as EVOH). Thus deposited EVOH was collected by decantation, and was ground with a mixer. The EVOH powder thus obtained was charged into a 1 g/L aqueous acetic acid solution (at a liquor ratio of 20=the ratio of powder (10 kg) to ion-exchange water (200 L)), and the mixture was stirred and washed for 2 hours. The mixture was deliquored, further charged into a 1 g/L, aqueous acetic acid solution (at a liquor ratio of 20), and then stirred and washed for 2 hours. After deliquoring, an operation including: charging the matter thus deliquored to ion-exchange water (at a liquor ratio of 20); stirring and washing the mixture for 2 hours; and deliquoring the mixture was repeated three times to carry out purification. Then, drying was carried out for 16 hours at 60° C. to obtain 2.5 leg of crude dry EVOH.

(3) Amount of Each Structural Unit in EVOH

In order to determine the structural units in the crude dry EVOH obtained in (2), 1H-NMR measurement was carried out. The crude dry EVOH obtained in (2) was dissolved in dimethyl sulfoxide (DMSO)-d6 containing tetramethylsilane as an internal standard substance and tetrafluoroacetic acid (TFA) as an additive, and was subjected to the measurement at 80° C. by using a 500 MHz 1H-NMR spectrometer ("GX-500" available from JEOL, Ltd.)

Each peak in the spectrum is assigned as follows.

0.6 to 1.9 ppm: methylene proton (4H) in the ethylene unit, methylene proton (2H) in the vinyl alcohol unit, methylene proton (2H) in the vinyl acetate unit 1.9 to 2.0 ppm: methyl proton (3H) in the vinyl acetate unit 3.1 to 4.2 ppm: methine proton (1H) in the vinyl alcohol unit The ethylene content and the degree of saponification were obtained from the peak strength ratio. The ethylene content of the crude dry EVOH obtained in (2) was 32 mol % and the degree of saponification thereof was 99% or greater.

(4) Production of Hydrous EVOH Pellets

Into a 100-L mixing vessel equipped with a jacket, a stirrer and a reflux condenser, 25 kg of the crude dry EVOH obtained in (2), 20 kg of water, and 20 g of MeOH were charged and were heated to 70° C. to permit dissolution. The solution was extruded, through a glass tube having a diameter of 3 mm, into a mixed solution of water and MeOH at a weight ratio of 90/10 cooled to 5° C., to permit deposition into a strand form. The strand was cut into pellets with a strand cutter, whereby hydrous EVOH pellets were obtained. The hydrous EVOH pellets were charged into a 1 g/L aqueous acetic acid solution (at a liquor ratio of 20), and then stirred and washed for 2 hours. The mixture was deliquored, further charged into a 1 g/L aqueous acetic acid solution (at a liquor ratio of 20), and then stirred and washed for 2 hours. After deliquoring, similar operations were performed with a fresh aqueous acetic acid solution. After washing with the aqueous acetic acid solution and deliquoring, an operation including: charging the matter thus deliquored into ion-exchange water (at a liquor ratio of 20); stirring and washing the mixture for 2 hours; and deliquoring the mixture was repeated three times to carry out purification, whereby hydrous EVOH pellets were obtained from which catalyst residues left after the saponification reaction, and MeOH used to permit deposition of the strand were removed. The moisture content of the hydrous EVOH pellets thus obtained was 110% by mass as determined by using a halogen moisture meter "HR73" available from Mettler Toledo.

Synthesis Example 2

Polymerization was carried out to obtain an EVAc inn a similar manner to (1) in Synthesis Example 1 except that 38.6 kg of MeOH was used, the ethylene pressure was maintained at 4.1 MPa, and 29.7 g of initiator was used. Four hours later, when the rate of polymerization of VAc reached 44%, the polymerization was stopped by cooling. Subsequently, the EVOH was synthesized as in Synthesis Example 1 to obtain a crude dry EVOH in which the ethylene content was 38 mol % and the degree of saponification was 99% or greater. Thereafter, hydrous EVOH pellet were obtained as in Synthesis Example 1.

Synthesis Example 3

Polymerization was carried out to obtain an EVAc in a similar manner to (1) in Synthesis Example 1 except that 17.2 kg of MeOH was used, the ethylene pressure maintained at 5.2 MPa, and 26.2 g of initiator vas used. Four hours later, when the rate of polymerization of VAc reached 44%, the polymerization was stopped by cooling. Subsequently, the EVOH was synthesized as in Synthesis Example 1 to obtain a crude dry EVOH in which the ethylene content as 44 mol % and the degree of saponification was 99% or greater. Thereafter, hydrous EVOH pellets were obtained as in Synthesis Example 1.

Synthesis Example 4

Into a 500-L reactor equipped with a jacket, a stirrer, a nitrogen-feeding port, a reflux condenser and a solution-adding port, 250 kg of the 20% by mass EVAc solution in MeOH obtained in (1) in Synthesis Example 1 was charged. While nitrogen gas was blown into the solution, the temperature of the solution was elevated to 60° C., and 0.6 kg of sodium hydroxide as a 2 N solution in MeOH was added. After the addition of sodium hydroxide, the mixture was stirred for 2 hours to allow the saponification reaction to proceed while the temperature in the system was maintained at 60° C. After a lapse of 2 hours, 0.6 kg of sodium hydroxide was added again in a similar manner, and the mixture was continuously stirred under heating for 2 hours. Thereafter, 2.1 kg of acetic acid was added to stop the saponification reaction, and then 50 kg of ion-exchange water was added to the mixture. MeOH and water were distilled off from the reactor while the mixture was stirred under heating, whereby the reaction liquid was concentrated. After a lapse of 3 hours, 50 kg of ion-exchange water was further added to permit deposition of an ethylene-vinyl alcohol copolymer (hereinafter, also referred to as EVOH). Thus deposited EVOH was collected by decantation, and was ground with a mixer. The EVOH powder thus obtained was charged into a 1 g/L aqueous acetic acid solution (at a liquor ratio of 20=the ratio of powder (10 kg) to ion-exchange water (200 L)), and the mixture was stirred and washed for 2 hours. The mixture was deliquored, further charged into a 1 g/L aqueous acetic acid solution (at a liquor ratio of 20), and then stirred and washed for 2 hours. After deliquoring, an operation including: charging the matter thus deliquored to ion-exchange water (at a liquor ratio of 20); stirring and washing the mixture for 2 hours; and deliquoring the mixture was repeated three times to carry out purification. Then, drying was carried out for 16 hours at 60° C. to obtain 25 kg of crude dry EVOH in which the ethylene content was 32 mol % and the degree of saponification was 97%. Thereafter, hydrous EVOH pellets were obtained as in Synthesis Example 1.

Synthesis Example 5

Polymerization was carried out to obtain an EVAc in a similar manner to Synthesis Example 2. Saponification and drying were carried out to obtain an EVOH as in Synthesis Example 4. 25 kg of crude dry EVOH in which the ethylene content was 38 mol % and the degree of saponification was 97% was obtained. Thereafter, hydrous EVOH pellets were obtained as in Synthesis Example 1.

Synthesis Example 6

Polymerization was carried out to obtain an EVAc in a similar manner as Synthesis Example 3. Saponification and drying were carried out to obtain an EVOH as in Synthesis Example 4. 25 kg of crude dry EVOH in which the ethylene content was 44 mol % and the degree of saponification was 97% was obtained. Thereafter, hydrous EVOH pellets were obtained as in Synthesis Example 1.

Example 1

(1) Production of EVOH Composition Pellets (EVOH Resin Composition)

The hydrous EVOH pellets obtained in Synthesis Example 1 were charged into an aqueous solution (at a liquor ratio of 20) with a 0.6 g/L sodium acetate concentration, a 0.5 g/L acetic acid concentration, a 0.02 g/L phosphoric acid concentration, and a 0.4 g/L boric acid concentration, and were immersed in the solution for 4 hours with stirring at regular intervals. The mixture was deliquored, dried in the air at 80° C. for 3 hours, and then dried in a nitrogen atmosphere at 120° C. for 15 hours. After the drying was completed, ethylenebis-stearic acid amide ("ALFLOW-H50FP" (powder; melting point: 143° C.) available from NOF CORPORATION) at a content of 100 ppm with respect to the EVOH was added as a lubricant and mixed to obtain EVOH composition pellets. Conditions are summarized in Table 1.

(2) Alkali Metal Content, Phosphoric Acid Compound Content, Boric Acid Content of EVOH Composition Pellets Into a Teflon (registered trademark) pressure container, 0.5 g of the EVOH composition pellets obtained in (1) were charged, and 5 mL concentrated nitric acid was added thereto, whereby the EVOH composed pellets were decomposed at room temperature for 30 min. After a lapse of 30 min, the container was covered with a lid, and a heat treatment was carried out at 150° C. for 10 min and a subsequent heat treatment was carried out at 130° C. for 5 min, by using a wet degradation device ("MWS-2" available from Actac Project Service Corporation), to permit degradation, and then the mixture was cooled to room temperature. The treatment liquid thus obtained was transferred to a 50-mL volumetric flask (TPX) and diluted with pure water to 50 mL. Metals contained in the solution were analyzed by using an ICP optical emission spectrophotometer ("OPTIMA4300DV" available from PerkinElmer Inc.), whereby the content of sodium element, the content of the phosphorus element, and the content of boron content were determined. The content of sodium salt in terms of a value of sodium element equivalent was 160 ppm, the content of phosphoric acid compound in terms of a value of phosphoric acid radical equivalent was 12 ppm, and the content of boric acid in terms of boron element equivalent was 770 ppm.

(3) Organic Acid Content of EVOH Composition Pellets

Into a 200 mL stoppered Erlenmeyer flask, 20 g of the EVOH composition pellets obtained in (1) and 100 mL of ion-exchange water were charged, and subjected to stirring extraction at 95° C. for 6 hours in the state in which the stoppered Erlenmeyer flask was equipped with a cooling condenser. The extract thus obtained was subjected to neutralization titration performed with N/50 NaOH by using phenolphthalein as an indicator, whereby the organic acid content was quantitatively determined. The acetic acid content was 350 ppm.

(4) Measurement Through Use of Hash DSC1

An EVOH composition pellet of 2 to 3 mm square was cut away with a razor, and a slice having a thickness of 10 μm was prepared by using a cutting tool such as a rotary microtome. The slice of 10 μm in thickness thus obtained was placed on a slide glass, and was trimmed by using a single-edged razor to obtain a piece having a length of 80 μm and a width of 80 μm while being observed under a microscope attached to Flash DSC1.

The slice having undergone the trimming was placed on a MultiSTAR UFS1 sensor available from Mettler Toledo through the use of a tool such as a hair pin. The MultiSTAR UFS1 sensor underwent preconditioning beforehand by the following procedure recommended by the manufacturer. To bring the slice into close contact with the sensor prior to the measurement, the EVOH composition was heated from 25° C. to 210° C. at a rate of 100° C./sec, maintained at 210° C. for 0.1 sec, and cooled to 25° C. at a rate of 100° C./sec. This operation was performed twice, and then sufficient contact of the slice with the sensor was checked. In some cases, the slice failed to be in contact with the sensor due to static electricity and the like in the course of the operation. When the failure occurred, the preparation of a slice and the subsequent steps were performed over again. After the sufficient contact of the EVOH composition slice with the sensor was checked, the crystallization of the EVOH composition was determined. Specifically, the composition was heated from 25° C. to 210° C. at a rate of 100° C./sec, maintained at 210° C. for 0.1 sec, and cooled from 210° C. to 25° C. at a rate of 150° C./sec.

(5) Analysis of DSC Chart

The DSC chart obtained by the cooling in (4) underwent a baseline process. The straight line connecting a point indicating the thermal flow value at 145° C. (the temperature lower than the melting point (183° C.) by 38° C.) and a point indicating the thermal flow value at 80° C. (the temperature lower than the melting point (183° C.) by 103° C.) was drawn, and the portion below the baseline was excluded from the DSC chart. Taking into consideration variations in the thermal flow value, the thermal flow value at 145° C. was calculated by averaging the thermal values over a temperature range of 144° C. to 146° C., and the thermal flow value at 80° C. was calculated by averaging the thermal values over a temperature range of 79° C. to 81° C. If the thermal flow value varies widely, it is impossible to determine a correct base line. In such a case, the measurement data was discarded, and the preparation of an EVOH composition slice and the subsequent steps were performed over again. After the portion below the base line was excluded, the integrated value of thermal flow changes observed over a temperature range of 145° C. to 80° C. was determined as the total amount of heat ($Q_{total}$) released due to crystallization of the EVOH composition. The integrated value of thermal flow changes observed over a temperature range of 145° C. to 108° C. (the temperature lower than the melting point (183° C.) by 75° C.) was determined as the amount of heat ($Q_{hetero}$) released due to the crystallization associated with the heterogeneous nucleation. Accordingly, the heterogeneous nucleation index (f) was calculated by the following formula, which represents the contribution of the crystallization associated with the heterogeneous nucleation.

$$f = Q_{hetero}/Q_{total}$$

To evaluate the crystallization of the EVOH composition, a series of operations including the production of an EVOH slice, the measurement through the use of Flash DSC1, and the calculation of the heterogeneous nucleation index (f) was performed at least three times. The arithmetic mean of "f's" obtained by the above operations, respectively, was determined as "f" of the EVOH composition. The f value of the EVOH composition (resin composition) obtained in Example 1 was 0.43.

Alkali metal content, phosphoric acid compound content, boric acid content, organic acid content of EVOH composition pellets and the f value were summarized in Table 2.

(6) Fumigant Barrier Performance of an EVOH Monolayer Film

Conditions for Preparing Monolayer Film

The resulting resin composition was formed into a monolayer film having thickness of 20 μm under the following condition.

Apparatus: 20 mmD single screw extruder (Labo Plastomill 15C300 manufactured by Toyo Seiki Seisaku-sho, Ltd.)

L/D: 20, Screw: full flight type

Die: 300 mm coat-hanger die

Extrusion temperature (° C.): C1=180, C2 to C3=220, Die=220

Screen mesh: 50/100/50

Temperature of cooling roll: 80° C.

Screw rotation speed: 40 rpm

Drawing speed: 3.0 m/minute to 3.5 m/minute

Conditions for Measuring a Fumigant (Chloropicrin) Barrier Performance of Monolayer Film The monolayer film to be tested was conditioned at 40° C./50% for 48 hours before attaching to permeability cells. Permeability cells were fabricated from stainless steel cylindrical stock of 12 cm ID following ASTM E2945-14. Cells were constructed in two halves, each approximately 4 cm long, sealed on one end by soldering a stainless steel plate to the column. The volume of each half-cell was measured. A piece of the monolayer film to be tested was placed between the two half-cells, and epoxy was used to secure the film and adhere the cell halves together in a gastight seal. Sampling ports were constructed from brass fittings machined with a center hole, which was plugged with Teflon-faced silicone septa. Ports were installed at the midpoint of each half-cell. Two ports were installed on opposite sides of one half-cell (source chamber). One port was installed in the receiving chamber. Samples were collected by piercing the septum with the needle of a gastight syringe and withdrawing an aliquot of the air within each half of the permeability cell. Between samplings, ports were additionally sealed by tightening a plastic cap containing a Teflon-faced silicone septum onto e brass fitting.

7.0 μL of Chloropicrin was placed in a 125-mL Erlenmeyer flask with valve. The liquid was allowed to vaporize, and 20 mL of the vapor was injected into the source chamber using a gastight syringe. During injection, a needle was placed in the second port of the source chamber to serve as a vent to avoid pressurizing the cell. Experiments were conducted at 40° C. Samples (500 μL, from the receiving chamber, 250 μL from the source chamber) were collected using gastight syringes and placed in 9-mL headspace vials. Vials were immediately crimp capped with aluminum seals and Teflon-faced butyl rubber septa. Sampling began 5 min after injection and continued for 40 days. Sample collected from cell were analyzed using a Tekmar 7000 headspace autosampler interfaced with an HP5890 GC-ECD manufactured by Hewlett Packard.

A mass transfer coefficient was calculated from the data following the method described in ASTM E2945-4.

(7) Thickness Distribution (Coefficient of Variation of EVOH thickness in Multilayer Articles)

Conditions for Preparing Multilayer Articles

The resulting resin composition was formed into a multilayer article under the following conditions, followed by trimming into a fumigant film having a width of 1400 mm and thickness of each layer and total thickness were shown in Table 3. Resin composition layer thickness was changed in each example.

Layer Structure 4-material-7-layer (outer layer A/outer layer B/adhesive resin layer C/EVOH resin composition layer D/adhesive resin layer E/outer layer F/outer layer G)

Outer layers A, B: Blend of LLDPE/mLLDPE/Black MB/UVI MB/Slip MB=68/20/10/4/4 wt % wherein LLDPE is SCLAIR FP120-A produced by NOVA Chemicals, mLLDPE is ELITE 5401G produced by Dow Chemical Company, Black MB is Ampacet 190580 produced by Ampacet Corporation, UVI MB is Ampacet 100840 produced by Ampacet Corporation and Slip MB is Ampacet 10090 produced by Ampacet Corporation.

Outer layers F, G: Blend of LLDPE/mLLDPE/White MB/UVI MB/Slip MB=68/20/10/4/4 wt % wherein LLDPE is SCLAIR FP120-A produced by NOVA Chemicals, mLLDPE is ELITE 5401G produced by Dow Chemical Company, White MB is Ampacet 112122 produced by Ampacet Corporation, UVI MB is Ampacet 100840 produced by Ampacet Corporation and Slip MB is Ampacet 10090 produced by Ampacet Corporation.

Adhesive resin layers C, E: Admer AT2474A produced by Mitsui Chemical

Conditions for Film Formation

Apparatus: a 7-material-7-layer blown film extruder (manufactured by Brampton Engineering)

Extruder:

Outer layer A: 45-mmφ single screw extruder (L/D=24), Outer layer B: 30-mmφ single screw extruder (L/D=24), Outer layer F: 30-mmφ single screw extruder (L/D=24), Outer layer G: 45-mmφ single screw extruder (L/D=24), Adhesive resin layer C: 30-mmφ single screw extruder (L/D=24), Adhesive resin layer E: 30-mmφ single screw extruder (L/D=24), Resin composition layer: 30-mmφ single screw extruder (L/D=20)

Temperature setting (° C.):

Outer layers A, B, F and G: C1/C2/C3/A=180/190/205/205

Adhesive resin layers C and E: C1/C2/C3/A=190/225/215/220

Resin composition layer D: C1/C2/C3/A=180/210/215/220

Die: 150 mm, temperature set at 220° C.

Blow up ratio: 3.09 (lay-flat width 735 mm)

Measuring of Thickness of Each Layer in The Multilayer Articles

Thickness of each layer in the multilayer articles was measured by following procedure. Samples was collected from center of width at the beginning of film preparation. Collected sample was cut by knife and sliced by microtome. Thickness of each layer was measured from cross section observation by microscope. Thickness of layer A and B, layer F and G could not separate because the boundary was unclear.

Measuring of Thickness Distribution (Coefficient of Variation of EVOH Thickness in Multilayer Articles)

Thickness distribution of the multilayer articles was measured by following procedure. Samples was collected from center of width every 100 m production. Collected sample was cut by knife and sliced by microtome. Thickness of resin composition layer was measured from cross section observation by microscope. Thickness distribution was evaluated by coefficient of variation (Standard deviation/Average of thickness) under criteria below and shown in Table 4.

A: Coefficient of variation <5%
B: Coefficient of variation 5-10%
C: Coefficient of variation 10%<

(8) Field Test of Fumigation

Field test of fumigation was conducted by using the multilayer articles. 200 pounds per acre of Chloropicrin was injected through the drip irrigation system under multi layer articles. Plot sizes were a single 52 inch ide by 75 foot long bed. Ambient temperature was about 40° C. Fumigant concentrations under the tarp were sampled at one location near the plot center with a MiniRAE 3000 VOC meter manufactured by RAE systems at 8 hours after application. The MiniRAE meter was calibrated with known concentrations of Chloropicrin prior to each sampling. The field test of fumigation was evaluated by the concentration under criteria below and shown in Table 4.

A: Chloropicrin concentration: 800 ppm<
B: Chloropicrin concentration: 600 ppm-800 ppm
C: Chloropicrin concentration: <600 ppm (9) Film Breakage When the multilayer articles was applied on the field, the film was elongated to unwind from film roll. The film breakage was evaluated after 100 times of unwinding process for the film under criteria below and shown in Table 4.

A: Not break
B: Break 1 time
C: Break more than 2 times

Examples 2 and 3

The hydrous EVOH pellets obtained in Synthesis Example 2 and 3 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2, 5 and 6.

For the calculation of the heterogeneous nucleation index (f), the melting point of each EVOH resin composition was used as the reference point to determine $Q_{total}$ representing the area of the total region surrounded by the DSC curve and the base line that is a straight line connecting a point indicating the thermal flow value at the temperature lower than the melting point by 38° C. and a point indicating the thermal flow value at the temperature lower the melting point by 103° C. Also, $Q_{hetero}$ was determined which represents the area of the heterogeneous region that is a part of the total region, falling within the range from the temperature lower than the melting point by 38° C. to the temperature lower than the melting point by 75° C. The same applies to Examples described below.

Comparative Example 1

The hydrous EVOH pellets obtained in Synthesis Example 1 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 4.

Comparative Example 2

The hydrous EVOH pellets obtained in Synthesis Example 4 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 4.

Comparative Example 3

The hydrous EVOH pellets obtained in Synthesis Example 2 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 5.

Comparative Examples 4

The hydrous EVOH pellets obtained in Synthesis Example 5 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 5.

Comparative Examples 5

The hydrous EVOH pellets obtained in Synthesis Example 3 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 6.

Comparative Examples 6

The hydrous EVOH pellets obtained in Synthesis Example 6 were charged into an aqueous solution containing additives such as the metal salts and organic acids shown in Table 1, and was immersed in the solution for 4 hours with stirring at regular intervals. The mixture was deliquored, dried in the air at 80° C. for 3 hours, and then dried under the conditions shown in Table 1. After the drying was completed, the lubricant was mixed under the conditions shown in Table 2 in a manner similar to that of Example 1, whereby EVOH composition pellets were obtained. As in Example 1, the resin was analyzed, and the barrier performance of EVOH monolayer film, thickness distribution, field test of fumigation, and film breakage were evaluated. The results of the evaluations are shown in Table 2 and 6.

As shown in Table 4 to 6, the EVOH pellets (resin compositions) of Examples 1 to 3 having an f value of less than 0.6 and having good barrier performance of the EVOH monolayer film at 40° C. and 50% relative humidity exhibited favorable results in terms of the thickness distribution, field test of fumigation, and film breakage. On the other hand, the thickness distribution, field test of fumigation, and film breakage of the EVOH pellets (resin compositions) of Comparative Examples 1 to 6 having an f value of 0.6 or greater, or having bad barrier performance of the EVOH monolayer film at 40° C. and 50% relative humidity, failed to reach the minimal level for the practical use.

Main factors responsible for the f value being 0.6 or greater in Comparative Examples 1 to 6 are as follows:
 Comparative Example 1: contained a large amount of the lubricant.
 Comparative Example 2: the degree of saponification of the EVOH was low.
 Comparative Example 3: contained a large amount of the lubricant
 Comparative Example 4: the degree of saponification of the EVOH was low.
 Comparative Example 5: contained a large amount of the lubricant.
 Comparative Example 6: The degree of saponification of the EVOH was low.

On the other hand, Examples 1 to 3 reveal that appropriate control of the degree of saponification, the amount of additives, the drying conditions, and the like enables the EVOH composition pellet (resin composition) having the f value of less than 0.6 to be obtained.

TABLE 1

| Ex. | Hydrous EVOH Pellet Used | Ethylene Content (mol %) | Degree of Sapon. (mol %) | Concentration of Each Additive in Aqueous Solution Used for Treating Hydrous EVOH Pellets Before Drying | | | | | | | Drying Conditions | | |
|---|---|---|---|---|---|---|---|---|---|---|---|---|---|
| | | | | NaOAc g/L | KOAc g/L | AcOH g/L | PrOH g/L | $H_3PO_4$ g/L | $KH_2PO_4$ g/L | $B(OH)_3$ g/L | Temp. (° C.) | Time (hr) | Drying Atmos. |
| 1 | Syn.Ex. 1 | 32 | 99 or greater | 0.6 | 0 | 0.5 | 0 | 0.02 | 0 | 0.4 | 120 | 15 | $N_2$ |
| 2 | Syn.Ex. 2 | 38 | 99 or greater | 0.7 | 0 | 0.5 | 0 | 0.1 | 0 | 0.8 | 110 | 20 | $N_2$ |
| 3 | Syn.Ex. 3 | 44 | 99 or greater | 0.4 | 0 | 0.5 | 0 | 0.06 | 0 | 0 | 110 | 20 | Air |
| C1 | Syn.Ex. 1 | 32 | 99 or greater | 0.6 | 0 | 0.5 | 0 | 0.02 | 0 | 0.4 | 120 | 15 | $N_2$ |
| C2 | Syn.Ex. 4 | 32 | 97 | 0.6 | 0 | 0.5 | 0 | 0.02 | 0 | 0.4 | 120 | 15 | $N_2$ |
| C3 | Syn.Ex. 2 | 38 | 99 or greater | 0.7 | 0 | 0.5 | 0 | 0.1 | 0 | 0.8 | 110 | 20 | $N_2$ |
| C4 | Syn.Ex. 5 | 38 | 97 | 0.7 | 0 | 0.5 | 0 | 0.1 | 0 | 0.8 | 110 | 20 | $N_2$ |
| C5 | Syn.Ex. 3 | 44 | 99 or greater | 0.4 | 0 | 0.5 | 0 | 0.06 | 0 | 0 | 110 | 20 | Air |
| C6 | Syn.Ex. 6 | 44 | 97 | 0.4 | 0 | 0.5 | 0 | 0.06 | 0 | 0 | 110 | 20 | Air |

TABLE 2

| Ex. | Hydrous EVOH Pellet Used | Content in EVOH Composition Pellet | | | | | | | | |
|---|---|---|---|---|---|---|---|---|---|---|
| | | Ethylene Content (mol %) | Degree of Saponification (mol %) | Na (ppm) | K (ppm) | AcOH (ppm) | PrOH (ppm) | Phosphate Compound (ppm) | $B(OH)_3$ (ppm) | Content of Lubricant (ppm) | f |
| 1 | Syn.Ex. 1 | 32 | 99 or greater | 160 | 0 | 350 | 0 | 12 | 770 | 100 | 0.43 |
| 2 | Syn.Ex. 2 | 38 | 99 or greater | 200 | 0 | 250 | 0 | 60 | 1500 | 200 | 0.45 |
| 3 | Syn.Ex. 3 | 44 | 99 or greater | 100 | 0 | 250 | 0 | 35 | 0 | 200 | 0.51 |
| C1 | Syn.Ex. 1 | 32 | 99 or greater | 160 | 0 | 350 | 0 | 12 | 780 | 1000 | 0.65 |
| C2 | Syn.Ex. 4 | 32 | 97 | 180 | 0 | 300 | 0 | 10 | 750 | 250 | 0.89 |
| C3 | Syn.Ex. 2 | 38 | 99 or greater | 200 | 0 | 250 | 0 | 60 | 1500 | 1000 | 0.68 |
| C4 | Syn.Ex. 5 | 38 | 97 | 180 | 0 | 220 | 0 | 55 | 1450 | 200 | 0.91 |
| C5 | Syn.Ex. 3 | 44 | 99 or greater | 100 | 0 | 250 | 0 | 35 | 0 | 1000 | 0.71 |
| C6 | Syn.Ex. 6 | 44 | 97 | 90 | 0 | 220 | 0 | 30 | 0 | 200 | 0.92 |

TABLE 3

| Example | Ethylene Content (mol %) | Degree of Saponification (mol %) | Thickness of Each Layer (μm) | Total Thickness (μm) |
|---|---|---|---|---|
| Example 1 | 32 | 99 or greater | A + B/C/D/E/F + G = 14.4/2.2/2.1/2.0/14.5 | 35.2 |
| Comparative Example 1 | 32 | 99 or greater | A + B/C/D/E/F + G = 14.3/2.1/2.1/2.2/14.4 | 35.1 |
| Comparative Example 2 | 32 | 97 | A + B/C/D/E/F + G = 14.5/2.2/2.1/2.1/14.3 | 35.2 |
| Example 2 | 38 | 99 or greater | A + B/C/D/E/F + G = 14.2/2.2/2.4/2.0/14.2 | 35.1 |
| Comparative Example 3 | 38 | 99 or greater | A + B/C/D/E/F + G = 14.1/2.1/2.4/2.2/14.2 | 35.1 |
| Comparative Example 4 | 38 | 97 | A + B/C/D/E/F + G = 14.3/2.2/2.4/2.1/14.1 | 35.2 |
| Example 3 | 44 | 99 or greater | A + B/C/D/E/F + G = 15.4/3.9/11.6/3.8/15.5 | 50.2 |
| Comparative Example 5 | 44 | 99 or greater | A + B/C/D/E/F + G = 15.3/3.8/11.6/3.9/15.4 | 50.0 |
| Comparative Example 6 | 44 | 97 | A + B/C/D/E/F + G = 15.6/3.8/11.6/3.8/15.3 | 50.1 |

TABLE 4

| Example | Ethylene Content (mol %) | Degree of Saponification (mol %) | Mass Transfer Coefficient for Chloropicrin at 40° C./50% RH (cm/hr) | f Value | Thickness Distribution | Field Test of Fumigation | Film Breakage |
|---|---|---|---|---|---|---|---|
| Example 1 | 32 | 99 or greater | 0.00066 | 0.43 | A | A | A |
| Comparative Example 1 | 32 | 99 or greater | 0.00068 | 0.65 | C | B | C |
| Comparative Example 2 | 32 | 97 | 0.0038 | 0.89 | C | C | C |

TABLE 5

| Example | Ethylene Content (mol %) | Degree of Saponification (mol %) | Mass Transfer Coefficient for Chloropicrin at 40° C./50% RH (cm/hr) | f Value | Thickness Distribution | Field Test of Fumigation | Film Breakage |
|---|---|---|---|---|---|---|---|
| Example 2 | 38 | 99 or greater | 0.00074 | 0.45 | A | A | A |
| Comparative Example 3 | 38 | 99 or greater | 0.00078 | 0.68 | C | B | C |
| Comparative Example 4 | 38 | 97 | 0.0065 | 0.91 | C | C | C |

TABLE 6

| Example | Ethylene Content (mol %) | Degree of Saponification (mol %) | Mass Transfer Coefficient for Chloropicrin at 40° C./50% RH (cm/hr) | f Value | Thickness Distribution | Field Test of Fumigation | Film Breakage |
|---|---|---|---|---|---|---|---|
| Example 3 | 44 | 99 or greater | 0.0036 | 0.51 | A | A | A |
| Comparative Example 5 | 44 | 99 or greater | 0.0039 | 0.71 | C | B | C |
| Comparative Example 6 | 44 | 97 | 0.0095 | 0.92 | C | C | C |

The invention claimed is:

1. A multilayer article comprising at least one layer formed from an EVOH resin composition predominantly comprising an EVOH component of one or more ethylene-vinyl alcohol copolymers, wherein (1) the EVOH resin composition exhibits a melting point within a range from 155° C. to 200° C., measured at a rate of 10° C./sec in accordance with the method described in ISO 11357-3 (2011);

(2) the EVOH resin composition has a heterogeneous nucleation index (f) of less than 0.6 as calculated by formula (I)

$$f = Q_{hetero}/Q_{total} \tag{I}$$

wherein:

$Q_{total}$ represents an area of a total region surrounded by a DSC curve and a base line that is a straight line connecting (i) a point indicating a thermal flow value at a temperature lower than the melting point of the EVOH resin composition by 38° C., and (ii) a point indicating a thermal flow value at a temperature lower than the melting point of the EVOH resin composition by 103° C.;

Qhetero represents an area of a heterogeneous region that is a part of the total region, falling within a range from the temperature lower than the melting point of the EVOH resin composition by 38° C. to a temperature lower than the melting point of the EVOH resin composition by 75° C.;

the DSC curve is obtained by differential scanning wherein the EVOH resin composition is cooled at a rate of 150° C./sec from a molten state at 210° C.; and (3) a monolayer film having thickness of 20 μm prepared from the EVOH resin composition exhibits a mass transfer coefficient (kc) for chloropicrin (cm/hr) that is less than the value calculated by formula (II), measured at 40° C. and 50% relative humidity in accordance with the method described in ASTM E2945-14

$$kc=0.00049x-0.0125 \quad (II)$$

wherein x=ethylene content of the EVOH component.

2. The multilayer article of claim 1, wherein the one or more ethylene-vinyl alcohol copolymers of the EVOH component possess a degree of saponification of about 99 mol % or greater.

3. The multilayer article of claim 1, wherein the one or more ethylene-vinyl alcohol copolymers of the EVOH component possess an ethylene content of about 18 mol % or greater and about 55 mol % or less.

4. The multilayer article of claim 1, wherein the EVOH resin composition comprises a content of a higher fatty acid amide of about 900 ppm or less with respect to the EVOH component.

5. The multilayer article of claim 1, where in the EVOH resin composition further comprises an alkali metal salt.

6. The multilayer article of claim 5, wherein the EVOH resin composition comprises a content of an alkali metal salt in terms of alkali metal element equivalent of about 10 ppm or greater and about 500 ppm or less.

7. The multilayer article of claim 1, in the form of a multilayer film.

8. The multilayer article of claim 7, wherein the total thickness of the multilayer film is from about 5 μm to about 200 μm, and the thickness ratio of the EVOH resin composition layer in the total layer thickness is from about 1% to about 30%.

9. The multilayer article of claim 1, having a structure A/AD/F/AD/A, wherein F is the EVOH resin composition layer, each A is a hydrophobic thermoplastic resin layer, and each AD is an adhesive resin layer.

10. The multilayer article of claim 9, wherein the multilayer article is a multilayer wherein the total thickness of the multilayer film is from about 5 μm to about 200 μm, the thickness of each hydrophobic resin composition layer is from about 0.5 μm to about 100 μm, and the thickness ratio of the EVOH resin composition layer in the total layer thickness is from about 1% to about 30%.

11. The multilayer article of claim 1, having a structure A/A/AD/F/AD/A/A, wherein F is the EVOH resin composition layer, each A is a hydrophobic thermoplastic resin layer, and each AD is an adhesive resin layer.

12. The multilayer article of claim 11, wherein the total thickness of the multilayer film is from about 5 μm to about 200 μm, the thickness of each hydrophobic resin composition layer is from about 0.5 μm to about 100 μm, and the thickness ratio of the EVOH resin composition layer in the total layer thickness is from about 1% to about 30%.

13. The multilayer article of claim 1, wherein the EVOH resin composition comprises a content of the higher fatty acid amide from 100 ppm to 200 ppm with respect to the EVOH component.

14. The multilayer article of claim 1, wherein the EVOH resin composition excludes an alkali metal salt and a boron compound.

15. The multilayer article of claim 1, wherein the EVOH resin composition has a heterogeneous nucleation index (f) of less than 0.55.

16. The multilayer article of claim 1, wherein the one or more ethylene-vinyl alcohol copolymers of the EVOH component possess an ethylene content of about 24 mol % or greater and about 44 mol % or less; the one or more ethylene-vinyl alcohol copolymers of the EVOH component possess a degree of saponification of about 99 mol % or greater; the EVOH resin composition comprises a content of the higher fatty acid amide from 100 ppm to 200 ppm with respect to the EVOH component.

17. The multilayer article of claim 1, wherein the EVOH resin composition excludes potassium and PrOH.

18. The multilayer article of claim 1, wherein the EVOH resin composition has a heterogeneous nucleation index (f) of 0.51 or less.

19. The multilayer article of claim 1, wherein the EVOH resin composition has a heterogeneous nucleation index (f) of 0.3 or more and 0.51 or less.

20. The multilayer article of claim 1, wherein the one or more ethylene-vinyl alcohol copolymers of the EVOH component possess an ethylene content of about 27 mol % or greater and about 48 mol % or less.

* * * * *